Oct. 24, 1933.  F. W. HOGAN ET AL  1,931,817
CARBON DIOXIDE RECOVERY APPARATUS
Filed Dec. 11, 1929  2 Sheets-Sheet 1
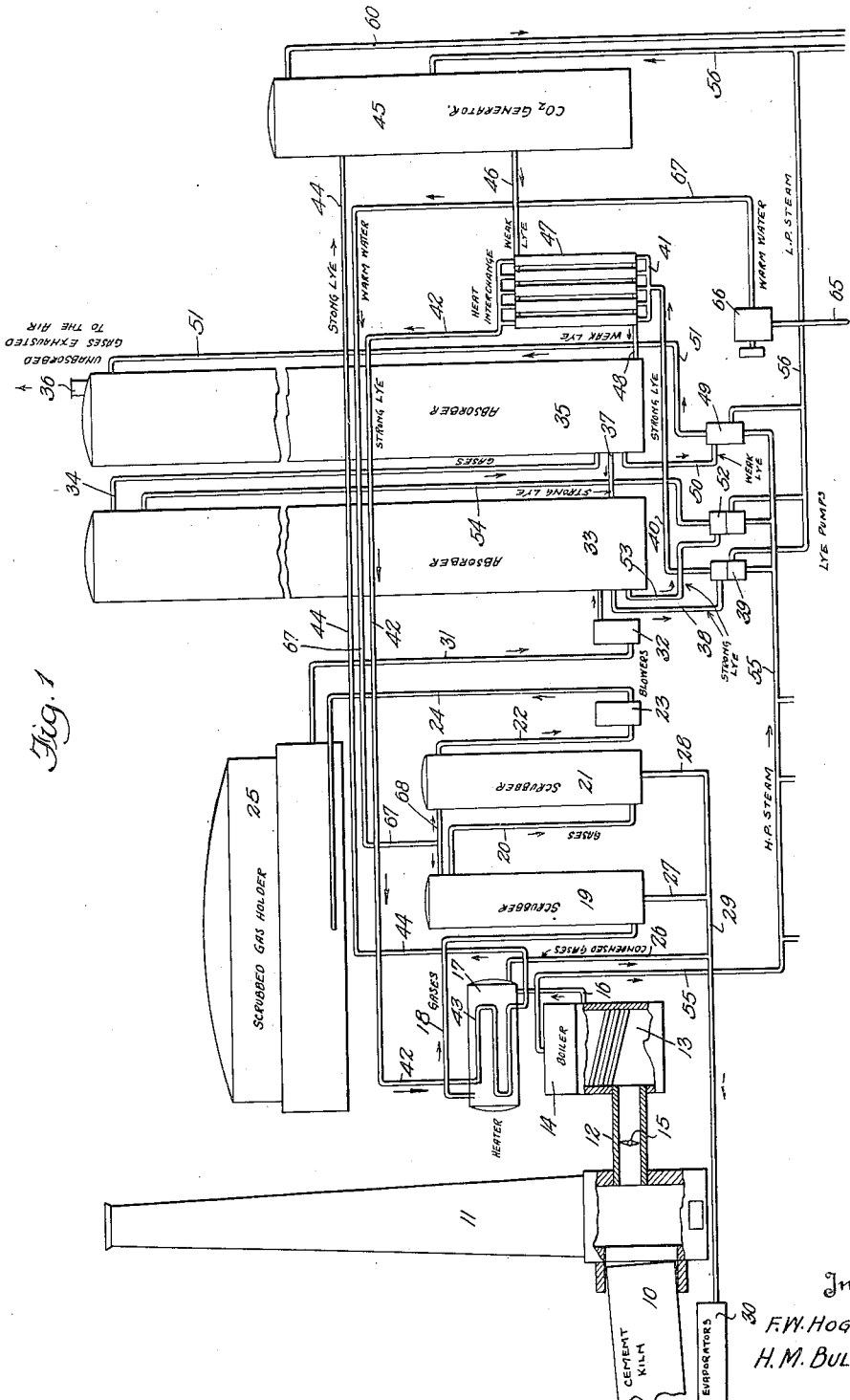
Inventors
F. W. HOGAN &
H. M. BULBROOK.
By Jack. A. Schley
Attorney

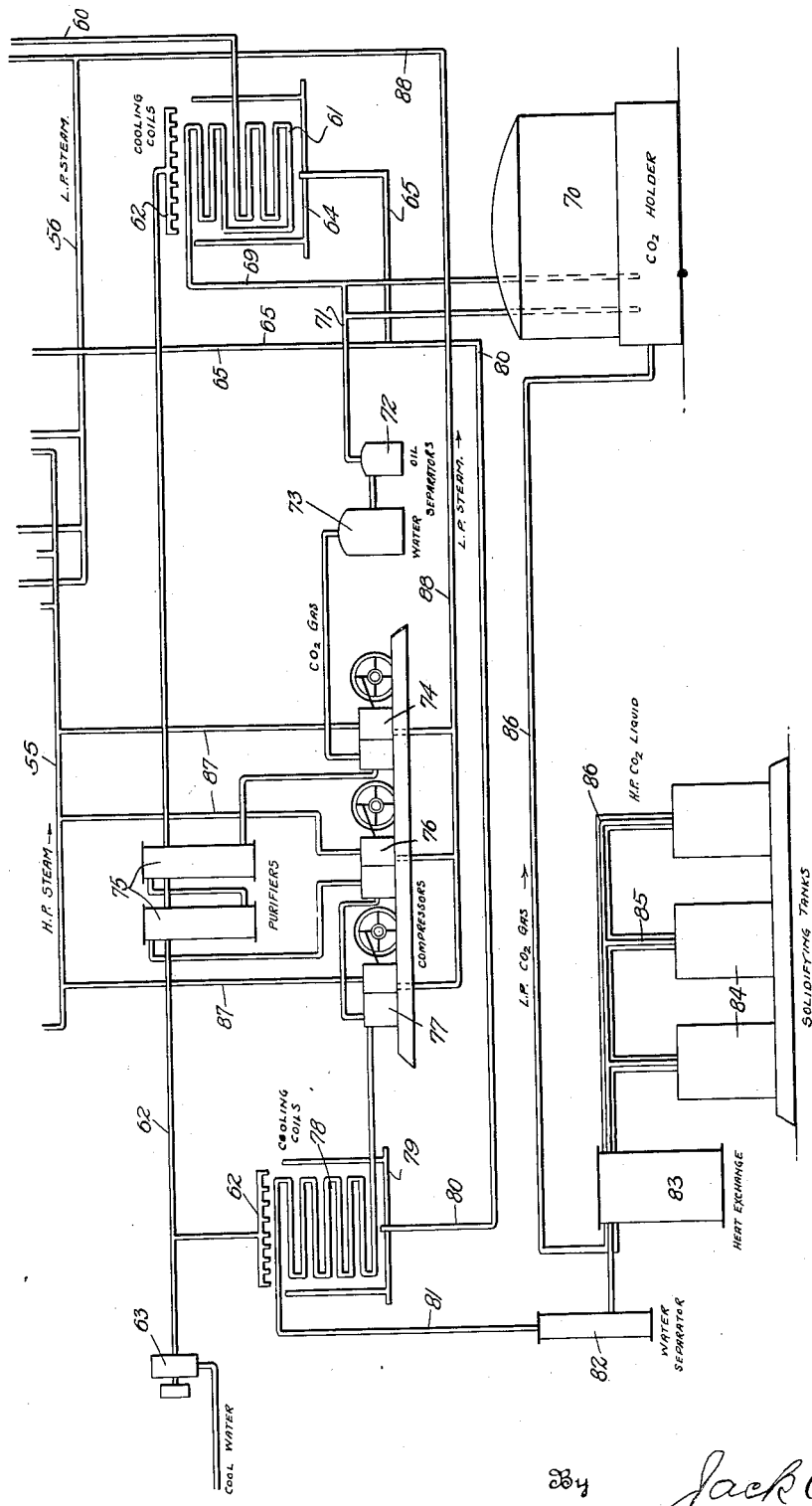

Patented Oct. 24, 1933

1,931,817

UNITED STATES PATENT OFFICE 1,931,817

CARBON DIOXIDE RECOVERY APPARATUS

Francis W. Hogan and Harry M. Bulbrook, Fort Worth, Tex., assignors of one-third to H. H. Adams, Fort Worth, Tex.

Application December 11, 1929
Serial No. 413,396

8 Claims. (Cl. 23—260)

This invention relates to a system for the recovery of carbon dioxide, and particularly to a novel process assemblage of apparatus designed to utilize the latent heat of stack gases prior to the treatment thereof for the recovery of the carbon dioxide.

In previous processes and systems for the recovery of carbon dioxide, the stack gas is fed directly into a scrubber where its temperature is reduced by the water applied without utilizing the high initial heat of the gas at the stack. The use of such because the lye used in the absorbers must be constantly reheated to maintain a proper temperature at the generator, and for the purpose of circulating such lye steam pressure is required for a series of pumps, the exhaust of which is conducted to said generator.

The present invention meets these requirements for heat and power by utilizing the latent heat of the stack gases before their introduction into a scrubber, and thus largely avoids the necessity of supplemental heating units. Specifically considered this system provides for passing the stack gases at their highest temperature into contact with a boiler for the generation of high pressure steam, and the discharge from such generator is passed through a chamber for the purpose of heating a circulating body of the lye used for the absorption of the carbon dioxide. A complete system is thus provided in which the temperature and chemical characteristics of the stack gases are fully used, as the potassium bicarbonate in the liquid from the lye heater and scrubber is recovered before the stack gases are passed to the absorbers.

The invention has for an object to provide a novel and improved system in which the strong lye from an absorber is circulated through a heater before its introduction into the dioxide generator, and the heat for that purpose provided by the stack gases before entering the scrubber.

Another object of the invention is to provide a steam generator for the lye circulating pumps disposed intermediate the stack and scrubber to receive the latent heat from the gases contacting with the generator in their passage to the scrubber.

A further object of the invention is to present a new pumping system for circulating the strong and weak lye through the absorbers and dioxide generator and reheating the strong lye before its introduction into the latter.

A still further object of the invention is to provide means to collect the condensed stack gases from the lye heater and scrubber and conduct them to a point of evaporation for recovery.

Other and further objects and advantages of the invention will be hereinafter set forth and novel features thereof defined by the appended claims.

In the drawings:

Fig. 1 is a diagram showing a portion of the system, and

Fig. 2 is a continuation thereof showing the final solidification of the carbon dioxide.

The stack gases from which the carbon dioxide is to be recovered may be provided from any desired source, but it has been found that the flue gases from cement kilns contain a much greater content or carbon dioxide by volume than the gases produced by the combustion of fuel alone. This renders the commercial recovery of the dioxide particularly profitable from a by-product, available for all uses, especially carbon dioxide refrigeration.

The system is therefore shown in connection with a cement kiln 10 having a stack 11 from which a duct 12 extends to a steam generator 13 having a boiler 14. The amount of heated gas flowing through this duct is controlled by a damper 15, and discharge line 16 from the generator connects with the chamber 17 of the lye heater. The most intense, sensible and latent heats are thus applied at the steam generator and a less temperature at the heater.

The stack gases are conducted from the heater by the line or pipe 18 and introduced at the lower portion of the scrubber 19. The discharge from the top of this scrubber is carried by the line 20 to the companion scrubber 21, and the pipe 22 extends from the top of the latter to the blower 23 by which the scrubber gas is fed by pipe 24 to the gas holder 25.

Condensate from the heater and both scrubbers is conducted by lines 26, 27 and 28 respectively to a conduit 29 extending to a suitable evaporator 30 by which the potassium bicarbonate from the gases is recovered.

The scrubbed stack gases are fed from the holder 25 by pipe 31 to a blower 32 by which they are introduced at the base of the first absorber 33 where they are brought in contact with an absorbing medium of weak lye such as a solution of sodium or potassium carbonate of suitable concentration. The unabsorbed gases from the first absorber pass down by a line 34 to the lower portion of a second absorber 35 from which any unabsorbed gas is exhausted by the valved outlet 36.

These absorbers are provided with the usual baffles and the carbon dioxide in the gas is absorbed by the sodium or potassium carbonate solution (weak lye) thereby converting it into sodium or potassium bicarbonate (strong lye). The terms "strong" lye and "weak" lye are herein used as relative descriptive terms and do not refer to any particular solution.

The strong lye from the second absorber passes to the first absorber by the connection 37 at the lower portions. Some of the strong lye is carried by pipe 38 to a circulating pump 39 from which a pipe 40 extends to a heat interchanger element 41 from which a line 42 conducts the strong lye to the heater 43 within the chamber 17. The pipe 44 from this heater is extended to the carbon dioxide generator 45. The line 46 connects this generator with the heat interchanger element 47 which is connected with the second absorber by the weak lye pipe 48. The pump 49 receives the weak lye from this absorber by conduit 50 and discharges it into the top thereof by line 51.

The pump 52 also receives strong lye from the base of the first absorber by line 53 and discharges it into the upper portion thereof by line 54. The several pumps before described are operated by high pressure steam through the pipe 55 from the boiler 14, and the low pressure exhaust from these pumps is carried by the line 56 to the carbon dioxide generator 45.

The liberated carbon dioxide gas at the generator 45 is connected by a pipe 60 to a cooling coil 61 which is supplied with cool water by a feed line 62 from a suitable source, and a pump 63 in said line. This cooling water is warmed by contact with the coil and collected in a tank 64 from which the pipe 65 extends to a pump 66. The feed from this pump is carried by pipe 67 to the scrubbers and introduced therein at 68. The cooled gas from the coil may be led by pipe 69 to the carbon dioxide holder 70.

In the practical application of the present system it is desirable to solidify the carbon dioxide for refrigeration purposes, and the gas may be conducted from the line 69 by a conduit 71 which also connects with the holder 70, and is in communication with an oil separator 72 and a water separator 73 from which it passes to the first compressing pump 74. This pump is connected to the purifiers 75 which discharge into the second compressing pump 76, and the discharge from the latter feeds to the third compressor 77. The carbon dioxide gas is now under high pressure and passes through a cooling coil 78, in the tank 79 to which cool water is fed from the feed line 62. The collected warm water in this tank is fed by pipe 80 to the pipe 65 extending to the pump 66 before described.

The $CO_2$ now in liquid form flows from coil 78 by a line 81 to a water separator 82 communicating with a counter current heat exchanger 83 from which it is liberated into the tanks 84 by pipes 85 to solidify by expansion in the usual Joule-Thompson effect. The low pressure gaseous body is conducted from the tanks by the pipe 86 which extends to the holder 70.

Power from the several compressors may be taken from the high pressure steam line 55 by branches 87, and the exhaust from the compressors is carried by a line 88 connecting with the steam line 56 to the carbon dioxide generator 45. Under certain conditions the stack gases may not be of sufficiently high temperature to provide all the heat and power required in the operation of the system, and in such event supplemental heat or power will be provided. The utilization of the latent heat of the gases greatly simplifies and economizes in the practical application of the system even if it be only used for heating the circulating lye to the necessary degree for separation of the carbon dioxide therefrom. The lye circulating system is particularly efficient since it feeds the weak lye to the absorbers at a low temperature and does not raise such temperature until the lye has absorbed the carbon dioxide and become a strong lye ready for final dioxide separation.

Many of the details of the system have been shown and described but the invention is not confined thereto as changes and alterations may be made therein without departing from the spirit of the invention as expressed in the following claims.

What we claim is:—

1. In a system of recovering carbon dioxide, a source of stack gases, a gas scrubber, an absorber, a carbon dioxide generator, a lye circulating circuit in communication with the absorber and generator, and a lye heater connected to said circuit and disposed intermediate the gas source and the scrubber and through which heater the stack gases pass before entering the scrubber and in which heater a material quantity of the heat of the stack gases is absorbed.

2. The system defined in claim 1, with pumps for said circulating circuit, and a fluid generator disposed intermediate the heater and gas source to be heated by the flow of stack gases to the scrubber and before the absorption of the heat of the stack gases in the said scrubber.

3. The system defined in claim 1, with a discharge for condensed stack gases extending from the heater and scrubber to an evaporator.

4. In a system of recovering carbon dioxide, a source of stack gases, a lye heater connected to the gas discharge from said generator, a scrubber connected to the stack gas discharge from said heater, an absorber connected to receive the scrubbed gas, means for circulating a weak lye therethrough, a second absorber, a carbon dioxide generator, means for circulating a hot weak lye from the generator to the second absorber, means for circulating the strong lye through the lye heater prior to its introduction into the dioxide generator.

5. The combination defined by claim 4 with a fluid generator connected to be heated by the stack gases, and a connection from the fluid generator to introduce heated fluid into the dioxide generator.

6. The combination defined by claim 4 with a heat exchanger disposed between the second absorber and dioxide generator and connected to the strong and weak lye circulating means.

7. The combination defined by claim 4 with a cooling coil connected to the dioxide discharge from its generator, a water circuit discharge upon said coil, and a connection for conducting warm water in said circuit from the coils to the scrubber.

8. The combination as defined by claim 1, with pumps for said circulating circuit, a fluid generator for operating said pumps connected to be heated by the flow of stack gases to the scrubber, and a connection from the fluid discharge of said pumps to conduct a heated fluid to the dioxide generator.

FRANCIS W. HOGAN.
HARRY M. BULBROOK.